United States Patent
Aschaber et al.

(10) Patent No.: US 9,027,990 B2
(45) Date of Patent: May 12, 2015

(54) MOTOR VEHICLE HAVING A ROOF OPENING

(71) Applicants: Christoph Aschaber, Graz (AT); Claus Careni, Bietigheim-Bissingen (DE); Berthold Klein, Sachsenheim (DE); Wolfgang Richter, Commerce Township, MI (US); Martin Rodler, Krottendorf (AT)

(72) Inventors: Christoph Aschaber, Graz (AT); Claus Careni, Bietigheim-Bissingen (DE); Berthold Klein, Sachsenheim (DE); Wolfgang Richter, Commerce Township, MI (US); Martin Rodler, Krottendorf (AT)

(73) Assignee: MAGNA STEYR Fahrzeugtechnik AG & Co KG, Graz (AT)

( * ) Notice: Subject to any disclaimer, the term of this patent is extended or adjusted under 35 U.S.C. 154(b) by 0 days.

(21) Appl. No.: 13/781,883

(22) Filed: Mar. 1, 2013

(65) Prior Publication Data
US 2014/0070572 A1    Mar. 13, 2014

(30) Foreign Application Priority Data

Mar. 1, 2012 (DE) .......................... 10 2012 101 753
Jun. 15, 2012 (DE) .......................... 10 2012 210 148

(51) Int. Cl.
*B60J 7/06* (2006.01)
*B60J 7/04* (2006.01)

(52) U.S. Cl.
CPC ..... *B60J 7/061* (2013.01); *B60J 7/04* (2013.01)

(58) Field of Classification Search
CPC .................................... B60J 7/06; B60J 7/061
USPC .................................. 296/219, 107.01–107.2
See application file for complete search history.

(56) References Cited

U.S. PATENT DOCUMENTS

| | | | | | |
|---|---|---|---|---|---|
| 2,921,814 | A | * | 1/1960 | Mede | ............................ 296/215 |
| 4,130,966 | A | * | 12/1978 | Kujawa et al. | .................. 49/141 |
| 4,161,336 | A | * | 7/1979 | LeVan et al. | ................... 296/218 |
| 7,240,960 | B2 | * | 7/2007 | Fallis et al. | .................... 296/218 |
| 7,416,247 | B2 | * | 8/2008 | Dunneback et al. | ........... 296/219 |
| 7,600,804 | B2 | * | 10/2009 | Froschle | ................... 296/107.07 |

FOREIGN PATENT DOCUMENTS

| | | |
|---|---|---|
| DE | 102005028193 A1 | 1/2006 |
| DE | 102012101752 A1 | 9/2013 |
| DE | 102012017478 A1 | 3/2014 |
| WO | WO2011/148069 | * 12/2011 |

* cited by examiner

*Primary Examiner* — Dennis H Pedder
(74) *Attorney, Agent, or Firm* — Jordan IP Law; Todd A. Vaughn

(57) ABSTRACT

A motor vehicle and a method for at least partially opening and closing a folding roof for the motor vehicle. The motor vehicle a roof frame defining a roof opening and a roof mechanism configured to permit a selective closing and at least partial opening of the roof opening. The roof mechanism includes a folding roof system having a hood cover with a plurality of spaced apart first transparent elements in a longitudinal direction of the motor vehicle and a second plurality of transparent elements between the first transparent elements and configured such that, in the at least partial opening of the roof opening, the hood cover forms folds in which the first transparent elements are positioned in an upper, upward-facing side of a fold and the second transparent elements are positioned in a lower, downward-facing side of a fold and are concealed by the first transparent elements.

15 Claims, 5 Drawing Sheets

MOTOR VEHICLE HAVING A ROOF OPENING

CROSS-REFERENCE TO RELATED APPLICATIONS

The present application claims priority under 35 U.S.C. §119 to German Patent Application Nos. DE 10 2012 101 753.0 (filed on Mar. 1, 2012) and DE 10 2012 210 148.9 (filed on Jun. 15, 2012), which are each hereby incorporated by reference in their respective entireties.

TECHNICAL FIELD

Embodiments relate to a motor vehicle having a roof opening in a solid roof surface of the motor vehicle and at least one roof mechanism for the selective closure and at least partial opening of the roof opening.

BACKGROUND

WO2011148069A1 discloses a motor vehicle having a convertible roof which is flexible, and has a multiplicity of rigid transparent plates in the longitudinal direction of the hood. The hood can fold and stack together and wherein the rigid plates are deposited one on top of the other. The plates are substantially rectangular and parallel to one another, such that their long sides extend in the transverse direction to the hood. Two consecutive plates are separated by a strip of the hood cover, and the strip of the hood cover substantially corresponds to the dimensioning of the strip of the rigid plates.

A drawback with this construction is that the hood cover strips have the same dimensions as the rigid transparent elements, whereby the area of visibility to the outside is restricted.

SUMMARY

In accordance with embodiments, an enhanced folding roof is provided such that the above-stated drawbacks are eliminated and a large region of the hood cover may be provided with transparent elements and configured such that when the hood cover is folded, the individual folds remain low relative to the deposition height.

In accordance with embodiments, a motor vehicle has a roof opening in a solid roof surface of the motor vehicle, and at least one roof mechanism for the selective closure and at least partial opening of the roof opening. The folding roof system includes at least one hood cover, in which at least one larger transparent element is disposed ad configured such that after the at least one larger transparent element are disposed smaller transparent elements arranged at least in several parts transversely to the direction of travel. At least one element has a camber transversely to the direction of travel, which camber substantially corresponds to that of the roof curvature.

In accordance with embodiments, a method for at least partially opening and closing a folding roof is provided in which in the folding roof larger and smaller transparent elements alternate in the longitudinal direction of the vehicle, and a drive moves the folding roof in the longitudinal direction of the vehicle for opening or for closure, so that the folding roof forms folds. In the folded state the larger transparent elements are deposited in the upper, upward-facing side of a fold, and the smaller transparent elements are deposited in the lower, downward-facing side of a fold and are hereupon concealed by the larger transparent elements.

In accordance with embodiments, the transparent elements may have, in addition to the curvature transversely to the direction of travel, a curvature in the longitudinal direction of the vehicle, substantially corresponding to that contour of the solid roof part.

In accordance with embodiments, all larger transparent elements have a curvature, corresponding to that of the roof curvature.

In accordance with embodiments, the smaller transparent elements can be constructed flat or cambered transversely and longitudinally to the direction of travel.

In accordance with embodiments, at least one transparent element is deposited on a fabric strip of the at least one hood cover. The construction may also provide, however, that all large transparent elements, for example, are deposited on the fabric strip of the hood cover, wherein, owing to the design of the folding roof, the uppermost and/or the bottommost transparent element can be excluded.

In accordance with embodiments, it can also be provided that additionally, for instance, the small transparent elements are deposited on the fabric strip of the hood cover.

In accordance with embodiments, a motor vehicle including a vehicle body having a roof frame defining a roof opening; a roof mechanism configured to permit a selective closing and at least partial opening of the roof opening, the roof mechanism comprising a folding roof system having a hood cover with a plurality of first transparent roof elements and a plurality of second transparent roof elements disposed after the first transparent roof element, wherein the transparent elements have a camber transversely to a direction of travel of the motor vehicle, which camber substantially corresponds to that of a curvature of the roof.

In accordance with embodiments, a motor vehicle a vehicle body includes: a roof frame defining a roof opening; and a roof mechanism configured to permit a selective closing and at least partial opening of the roof opening, the roof mechanism comprising a folding roof system having a hood cover with a plurality of spaced apart first transparent elements in a longitudinal direction of the motor vehicle and a second plurality of transparent elements between the first transparent elements and configured such that, in the at least partial opening of the roof opening, the hood cover forms folds in which the first transparent elements are positioned in an upper, upward-facing side of a fold and the second transparent elements are positioned in a lower, downward-facing side of a fold and are concealed by the first transparent elements.

In accordance with embodiments, a roof mechanism for a motor vehicle includes a folding roof system configured to permit a selective closing and at least partial opening of a roof opening of the motor vehicle, and having a hood cover with a plurality of spaced apart first transparent elements in a longitudinal direction of the motor vehicle and a second plurality of transparent elements between the first transparent elements and configured such that, in the at least partial opening of the roof opening, the hood cover forms folds in which the first transparent elements are positioned in an upper, upward-facing side of a fold and the second transparent elements are positioned in a lower, downward-facing side of a fold and are concealed by the first transparent elements.

In accordance with embodiments, a method for at least partially opening and closing a folding roof for a motor vehicle includes: providing a plurality of spaced apart first transparent elements in a longitudinal direction of the motor vehicle, and a second plurality of transparent elements between the first transparent elements, selectively manipulating the folding roof in the longitudinal direction of the motor vehicle in a closed state such that the folding roof forms fold in which the first transparent elements are positioned in an upper, upward-facing side of a fold and the second transparent elements are positioned in a lower, downward-facing side of a fold and are concealed by the larger transparent elements Advantageously, as a result of the depositing of the transparent elements on the fabric strip of the at least one hood cover, a reliable protection from damage, abrasion and unwelcome noise development through banging together of the transparent elements is ensured.

As a result of the connection of material to the transparent elements, in which the smaller transparent elements are deposited under the larger elements, the transparent elements are advantageously prevented from being able to directly touch one another, whereby undesirable noise generation is prevented.

In accordance with embodiments, the smaller transparent elements are narrower than the larger elements and are arranged at least in several parts in the transverse direction. The smaller transparent elements are connected to one another by a fabric strip of the hood cover, which elements permit folding/buckling of the folding roof in the transverse direction. The smaller transparent elements may conform to the curvature of the larger transparent elements and thus, in the depositing operation, form a relatively flat structure in terms of the deposition height.

As a result, all larger transparent elements lie one upon the other with their respective inner side, whereby the smaller transparent elements are disposed between the large transparent elements. The smaller transparent elements are here arranged such that their inner face is facing the inner face of the respective larger transparent element, and the outer face of the small transparent element is facing the respective outer face of the larger transparent element.

In accordance with embodiments, the transparent elements are separated from one another by fabric strips of the hood cover. The fabric strips of the hood cover allow folding of the folding roof, whereby this, when opened, can be deposited in appropriately stacked formation.

In accordance with embodiments, the fabric strips of the hood cover between the smaller transparent elements assist in the formation of a curvature transversely to the direction of travel. This is substantially achieved by the fact that the roof bow and folding bow, as are known, in interaction with the small transparent elements in the hood cover, in accordance with their geometry, form the hood cover.

In accordance with embodiments, the roof mechanism has a front and a rear folding roof system. The front folding roof system and the rear folding roof system may be opened and closed independently of each other, and at least the rear folding roof system is displaceable in forwards and rearwards directions. The actuation of the folding roof system takes place via a drive, which is realized mechanically, pneumatically, hydraulically, electrically, manually, or from a combination thereof.

In accordance with embodiments, the rear region of the roof opening in the longitudinal direction of the vehicle is configured larger than the front region of the roof opening.

In accordance with embodiments, the rear hood cover is disposed on a rear roof frame, wherein the rear roof frame constitutes a rearwardly open U-shape. The rear roof opening may be closed or opened in frontwards and/or rearwards directions by the hood cover.

These features allow a large loading space to be created when the hood is opened in a frontwards direction. Simple loading even with a relatively tall load, such as bicycles, is thereby enabled in a simple manner.

In accordance with embodiments, the fitting of the at least one transparent element in the hood cover is realized by way of foaming. As a result of the bulge which is formed in the foaming, the transparent elements deposited in the folded state are prevented from being able to mutually touch, whereby damage, abrasion and unwelcome noise development through banging together of the transparent elements is prevented. It is conceivable, however, for the fitting of the transparent elements to be realized by gluing, welding or any other known fastening option. If other fastening options are used to fit the transparent elements in the hood cover, devices which reliably prevent mutual contact of the transparent elements are provided.

In accordance with embodiments, the hood cover has a plurality of transparent elements in the longitudinal direction of the vehicle. A large range of visibility to the outside is thereby created.

In accordance with embodiments, the plurality of transparent elements in the longitudinal direction of the vehicle are constructed as stiff or otherwise rigid elements. It is also conceivable, however, for the transparent elements to be made from a non-stiff material. The geometry of the transparent elements may here have any chosen patterns.

In accordance with embodiments, the fastening of the front hood cover and of the rear hood cover is realized via the at least one larger transparent element.

In accordance with embodiments, the folding of the at least one hood cover is realized via the additionally arranged support elements. The support elements are disposed in guide elements located in guide rails. The mountings for the guide elements may be jointly foamed in the foaming of the transparent elements. In another fastening option, metal frames, on which appropriate mountings for the support elements are fitted between the guide elements and the transparent elements, may also be provided.

In accordance with embodiments, the folding can be effected via folding bows, such as are described, for instance, in DE 4041763C1.

DRAWINGS

Embodiments are described by way of example below with reference to the drawings.

DESCRIPTION

Figure 1:
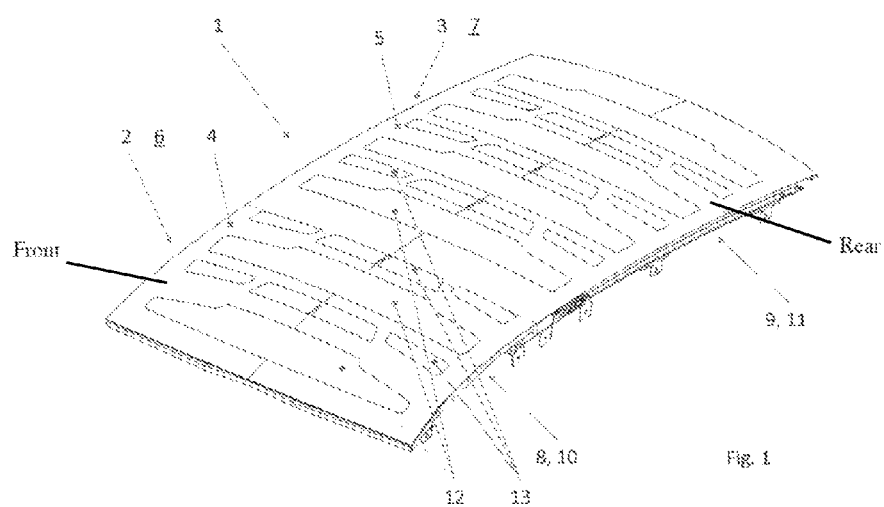
FIG. 1 illustrates a roof mechanism in the closed state, in accordance with embodiments.

As illustrated in FIG. 1, a roof mechanism 1 is represented in the closed state. The roof mechanism 1 here comprises a front folding roof system 2 and a rear folding roof system 3. A front hood cover 4 and a rear hood cover 5 close off a front region of the roof opening 6 and a rear region of the roof opening 7, respectively. The front hood cover 4 is here assigned to a front roof frame 10, the rear hood cover 5 to a rear roof frame 11. In the front and rear roof frame 10, 11, non-interconnected guide rails 8, 9 are respectively integrated in the front and rear roof frame 10, 11. The guide rails 8, 9 are configured to receive the movable roof elements 12, 13.

The front and the rear hood cover 4, 5 have transparent roof elements 12, 13, which have different widths and/or lengths and/or shapes. The transparent elements 12, 13 have a curvature, which substantially approximately corresponds to that of the solid roof element. By "approximately" is here understood a variance of max. 20% from the degree of curvature of the solid roof element, since the solid roof element generally has no constant concavity in the longitudinal direction of the vehicle and transverse direction of the vehicle and since the transparent elements 12, 13, in manufacture, have variances in accordance with the production tolerances. Similarly, variances are possible due to the installation tolerances in the hood cover 4, 5, as well as the installation position of the folding roof system 2, 3 in the motor vehicle itself, which is likewise subject to installation tolerances. The folding roof 1, when tautened, strives to form a plane surface. In the shaping of the curvature, roof bows connected to the motor vehicle are critical, which roof bows are arranged in the transverse direction of the vehicle. Hence variances from the "ideal" roof curvature of the solid roof element are likewise possible.

Figure 2:
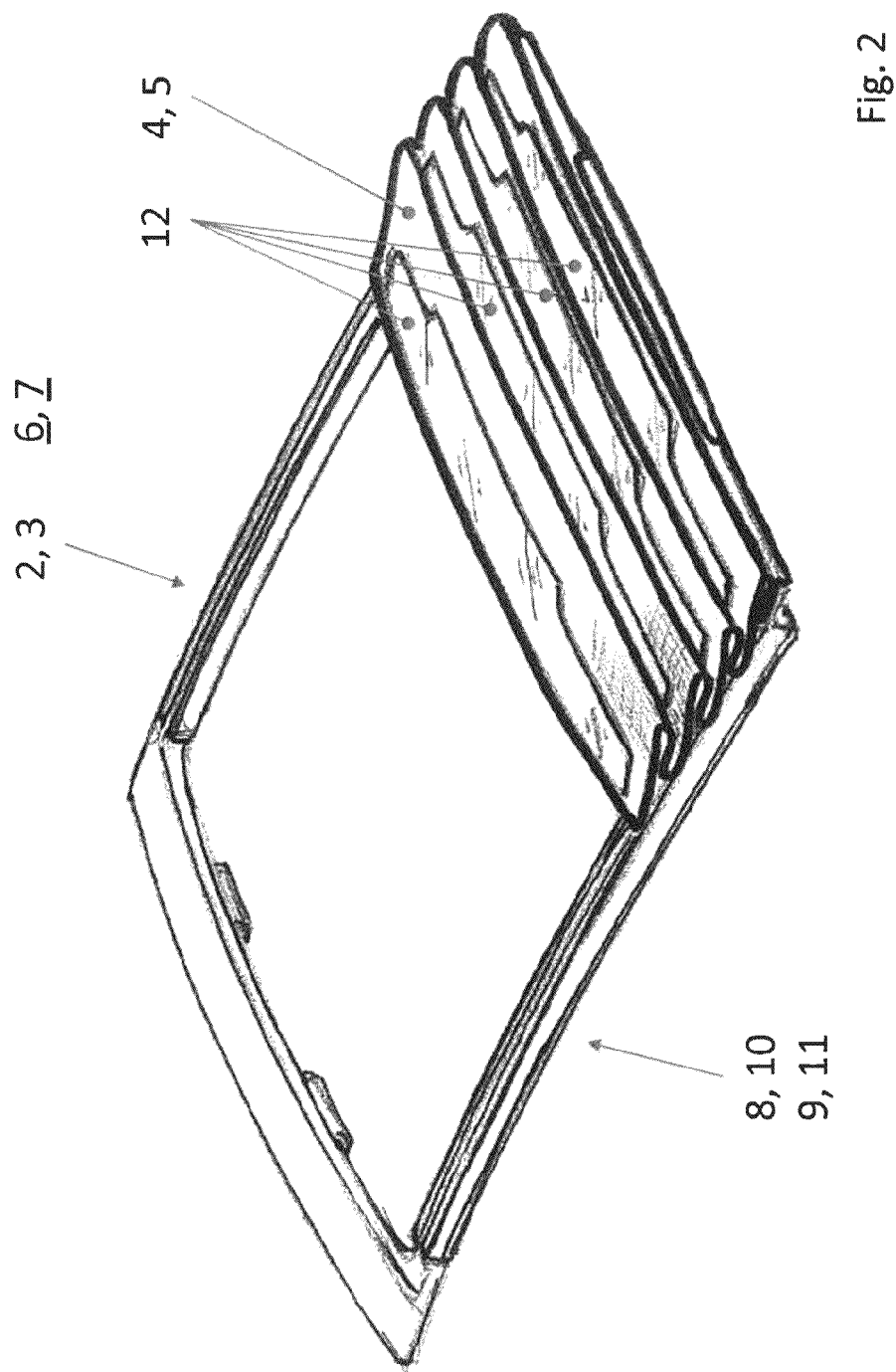
FIG. 2 illustrates a rear folding roof system in an opened state, in accordance with embodiments.

As illustrated in FIG. 2, in accordance with embodiments, the rear folding roof system 3 is represented in a first type of opened state. The hood cover 4, 5 folds between the transparent elements 12, 13, in which the larger transparent elements 12 are deposited upwards and the smaller transparent elements 13 are deposited beneath the larger transparent elements 12 and are concealed by the larger transparent elements 12.

FIG. 2 may also be envisaged as an opening setting for the folding roof system 2. In the opened state, the front hood cover 4 is opened in a rearwards direction, viewed in the longitudinal direction of the vehicle. The opened front hood cover 4 is configured in the opened state simultaneously as a draught deflector for the rear region of the roof opening 7. The folding is realized via additional support elements or via roof bows, not represented in FIG. 2.

Figure 3:
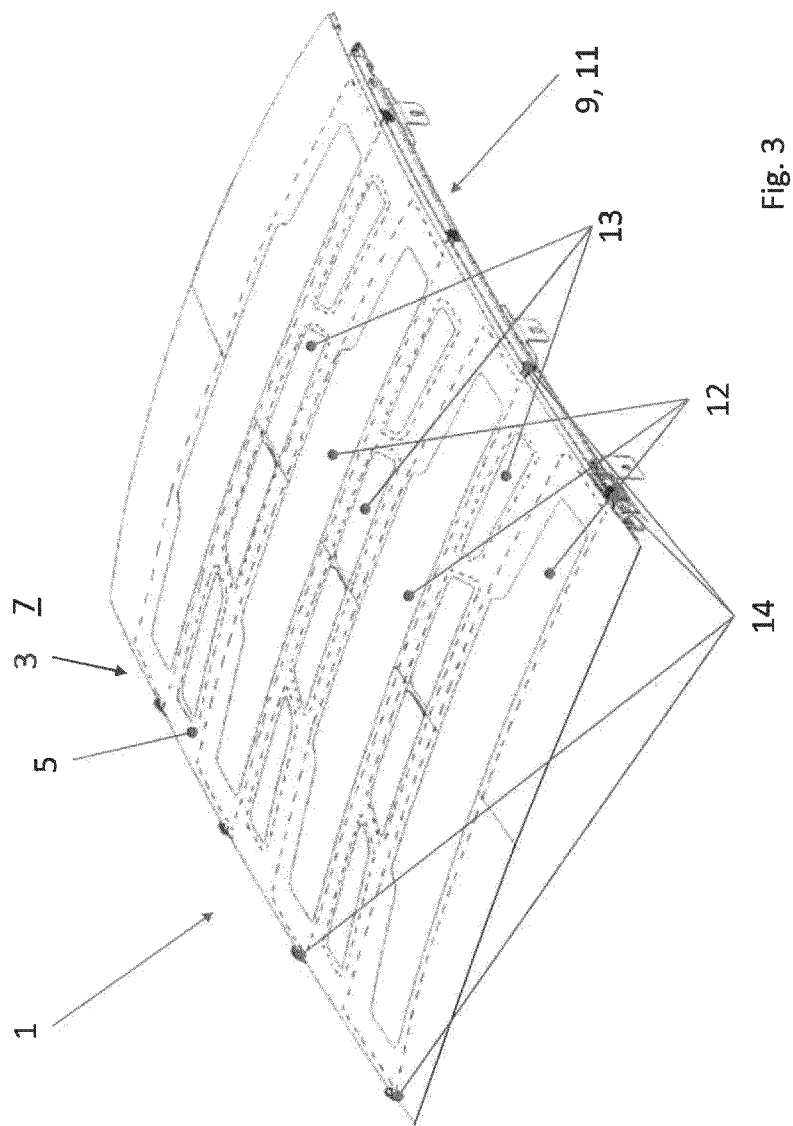
FIG. 3 illustrates a rear folding roof system with fastenings for transparent elements in guide rails, in accordance with embodiments.

FIG. 3 illustrates the rear hood cover 5 in the closed state. In the region of the roof frames 10, 11, fastenings for the transparent elements in the guide rails 14 are provided.

Figure 4:
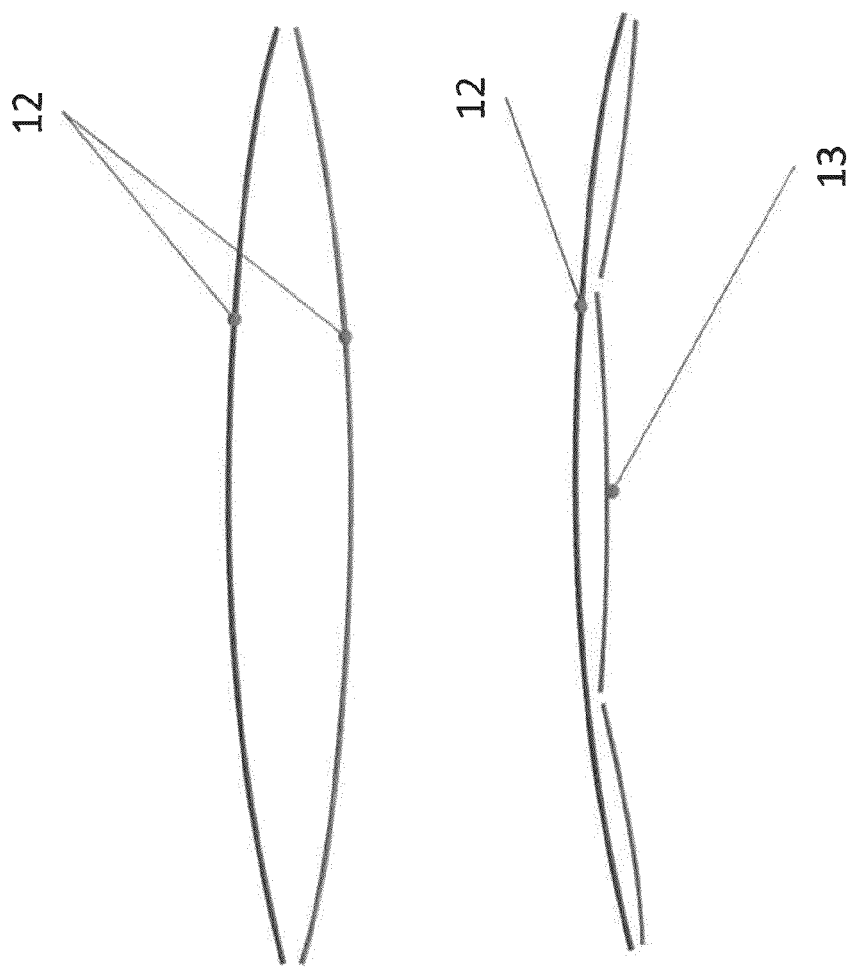
FIG. 4 illustrates in a basic representation the different spatial requirement in respect of undivided and divided smaller transparent elements.

FIG. 4 illustrates in a basic diagram the reduced spatial requirement when the folding roof 2, 3 is deposited in the opened state. The upper embodiment illustrates two transparent elements 12 in the deposited state, in which, due to the camber, in accordance with a roof curvature of a solid roof of a motor vehicle, the spatial requirement for the deposited folding roof 2, 3 is relatively large.

In the lower embodiment of FIG. 4, a system is proposed, in which the smaller transparent elements 13 are configured in a divided design, and a fabric strip of the hood cover 4, 5 (not illustrated), is provided between the smaller transparent elements 13. The fabric strip, in the depositing of the folding roof 2, 3, in the opened state, is configured to fold/buckle in the transverse direction to the longitudinal direction of the vehicle, so that the smaller transparent elements 13 may be deposited flatly beneath the larger transparent elements 12 and thus require a substantially smaller spatial requirement in terms of the deposition height.

Figure 5:
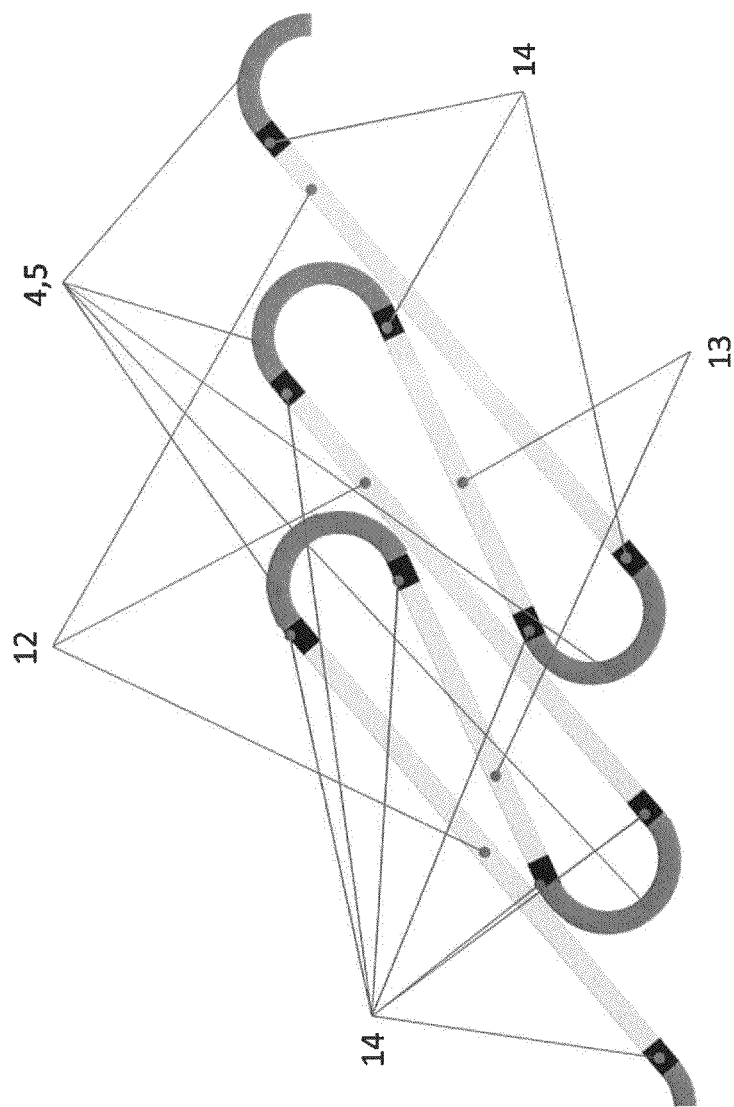
FIG. 5 illustrates in a basic representation the depositing of the stiff transparent elements onto the hood cover.

In FIG. 5, an inventive depositing of the transparent elements 12, 13 on the hood cover 4, 5 is represented. The stiff or rigid transparent elements 12, 13 are here deposited on the relatively soft hood cover 4, 5.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

LIST OF REFERENCE NUMERALS 1 roof mechanism
2 front folding roof system
3 rear folding roof system
4 front hood cover
5 rear hood cover
6 roof opening, front region
7 roof opening, rear region
8 guide rail
9 guide rail
10 front roof frame
11 rear roof frame
12 larger transparent elements
13 smaller transparent elements
14 fastening for transparent elements in guide rails

What is claimed is:

1. A motor vehicle, comprising:
a roof opening in a solid roof surface of the motor vehicle; and
a roof mechanism for a selective closure and at least partial opening of the roof opening, the roof mechanism having at least one roof cover, in which is disposed at least one first transparent element, and a plurality of second transparent elements disposed after the at least one first transparent element transversely to a direction of travel of the motor vehicle, each of the plurality of second transparent elements having a size that is less than a size of the at least one first transparent element, wherein the transparent elements each have a camber transversely to the direction of travel, which camber substantially corresponds to a curvature of the roof of the motor vehicle, the smaller second transparent elements forming a reduced camber in a folded state.

2. The motor vehicle of claim 1, wherein the at least one first transparent element and the plurality of second transparent elements are separated by fabric strips of the at least one roof cover.

3. The motor vehicle of claim 1, wherein a curvature of the plurality of second transparent elements, transversely to the direction of travel, is achieved via fabric strips of the at least one roof cover.

4. The motor vehicle of claim 1, wherein the roof mechanism comprises a front roof cover and a rear roof cover.

5. The motor vehicle of claim 4, wherein one of the at least one first transparent element fastens the front roof cover and of the rear roof cover to each other.

6. The motor vehicle of claim 1, wherein the wherein the at least one first transparent element and the plurality of second transparent elements are disposed on the roof cover in a longitudinal direction of the motor vehicle.

7. The motor vehicle of claim 1, wherein the at least one first transparent element and the plurality of second transparent elements are composed of a stiff material.

8. The motor vehicle of claim 1, wherein the folding of the at least one roof cover is realized via additionally arranged support elements.

9. The motor vehicle of claim 1, wherein in a folding of the least one roof cover, the plurality of second transparent elements are deposited beneath the at least one first transparent element.

10. A motor vehicle, comprising:
a roof mechanism for a selective closure and at least partial opening of a roof opening, the roof mechanism having at least one roof cover in which is disposed a plurality of second transparent elements between adjacent first transparent elements transversely to a direction of travel of the motor vehicle, each of the plurality of second transparent elements having a size that is less than a size of the first transparent elements,
wherein:
the transparent elements have a camber transversely to the direction of travel, which camber substantially corresponds to a curvature of the roof of the motor vehicle; and
in the at least partial opening of the roof opening, the roof cover forms a fold in which the first transparent elements are positioned in an upper, upward-facing side of a fold and the second transparent elements are positioned in a lower, downward-facing side of a fold and are concealed by the first transparent elements, the smaller second transparent elements forming a reduced camber in a folded state.

11. The motor vehicle of claim 10, wherein the first transparent elements and the plurality of second transparent elements are separated by fabric strips of the at least one roof cover.

12. The motor vehicle of claim 10, wherein a curvature of the plurality of second transparent elements, transversely to the direction of travel, is achieved via fabric strips of the at least one roof cover.

13. The motor vehicle of claim 10, wherein the roof mechanism comprises a front roof cover and a rear roof cover.

14. The motor vehicle of claim 13, wherein one of the first transparent elements fastens the front roof cover and of the rear roof cover to each other.

15. A method for operating a folding roof of a motor vehicle, the method comprising:
providing a plurality of relatively smaller second transparent elements between a pair of spaced apart first transparent elements in an alternating manner in a longitudinal direction of the motor vehicle and transversely to a direction of travel of the motor vehicle, each having a camber transversely to the direction of travel;
selectively moving the folding roof in the longitudinal direction of the motor vehicle between an at least partially open state to a closed state such that that the folding roof forms folds in which the first transparent elements are deposited in an upper, upward-facing side of a fold, and the plurality of second transparent elements are deposited in a lower, downward-facing side of a fold and are concealed by the first transparent elements, the smaller second transparent elements forming a reduced camber in a folded state.

* * * * *